Patented June 3, 1924.

1,496,084

UNITED STATES PATENT OFFICE.

KAROL DZIEWOŃSKI, OF CRACOW, POLAND.

PROCESS FOR PREPARATION OF DYESTUFFS WHICH CONSISTS IN TREATING DINAPHTHYLENETHIOPHENE BY SULPHURIC ACID, ETC.

No Drawing. Original application filed March 3, 1921, Serial No. 449,590. Divided and this application filed December 1, 1921. Serial No. 519,102.

*To all whom it may concern:*

Be it known that I, KAROL DZIEWOŃSKI, a citizen of the Polish Republic, and resident of Cracow, Poland, have invented certain new and useful Improvements in Processes for Preparation of Dyestuffs which Consist in Treating Dinaphthylenethiophene by Sulphuric Acid, Etc., of which the following is a specification.

In the Patent 1,471,150, Oct. 16, 1923, I have described a process for the preparation of dyestuffs by the action of sulphuric acid upon dinaphthylenethiophene.

I have now found that by treating the dinaphthylenethiophene with a mixture of sulphuric acid and azotic acid respectively by treating its products of sulphonation by azotic acid new dyestuffs of greater intensity are obtained.

In said patent is shown an example of carrying through the process claimed in said patent according to which 10 parts of dinapthylenethiophene are heated with 40 parts of ordinary concentrated and 2 parts of fuming sulphuric acid up to 100–110° for 8 hours. By the reaction an amorphous violet-black compound insoluble in water and 2 red respectively brown coloured sulphonic acids of dinaphthylenethiophene are formed, which are differentiated by the solubility of their barium and calcium salt.

The separated amorphous violet-black compound is taken up by a solution of sodium sulphide with a reddish violet colour and when so dissolved dyes unmordanted cotton grey-violet and may be used as a direct colouring sulphur dyestuff.

A similar violet-black body difficultly soluble in water and alkalies is obtained as a main product when treating dinaphthylenethiophene dissolved in nitrobenzol with concentrated sulphuric acid.

It was found, that when such products are treated with nitric acid, dyestuffs are obtained, which are of still greater intensity and give with sodium sulphide respectively alkaline hydrosulphide a reddish dark-brown dye which colours cotton.

A similar sulphur dye of still greater intensity and of reddish dark-brown shade is obtained with an excellent yield when treating directly dinaphthylenethiophene with a mixture of nitric acid and sulphuric acid. No acid dyes are obtained in this case with sulphuric acid alone.

What I claim is:—

A process for the preparation of dyestuffs, which consists in treating dinaphthylenethiophene by sulphuric acid and nitric acid.

In testimony that I claim the foregoing as my invention, I have signed my name in presence of two subscribing witnesses.

KAROL DZIEWOŃSKI.

Witnesses:
 ALEKSANDER TSYUKOW,
 ARTUR REUVERT.